US007396607B2

(12) United States Patent
Masaka et al.

(10) Patent No.: US 7,396,607 B2
(45) Date of Patent: Jul. 8, 2008

(54) MANUFACTURING PROCESS FOR MEMBRANE-ELECTRODE ASSEMBLIES

(75) Inventors: Fusazumi Masaka, Tokyo (JP); Kiyonori Kita, Tokyo (JP); Yuichiro Hama, Wako (JP); Masaru Iguchi, Wako (JP); Naoki Mitsuta, Wako (JP); Junichi Yano, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 10/773,317

(22) Filed: Feb. 9, 2004

(65) Prior Publication Data

US 2004/0163760 A1 Aug. 26, 2004

(30) Foreign Application Priority Data

Feb. 20, 2003 (JP) ............................ 2003-042966

(51) Int. Cl.
*H01M 4/00* (2006.01)

(52) U.S. Cl. ............................ 429/29; 429/30; 429/33

(58) Field of Classification Search .................. 429/30, 429/33, 29

See application file for complete search history.

(56) References Cited

U.S. PATENT DOCUMENTS 6,187,231 B1 * 2/2001 Sansone et al. ............... 264/41
6,197,147 B1 * 3/2001 Bonsel et al. ............... 156/269
6,524,736 B1 * 2/2003 Sompalli et al. .............. 429/42
2002/0071980 A1 6/2002 Tabata et al.
2002/0155340 A1 * 10/2002 Nanaumi et al. .............. 429/40
2003/0173547 A1 * 9/2003 Yamakawa et al. .......... 252/500

FOREIGN PATENT DOCUMENTS

| | | |
|---|---|---|
| EP | 0 718 903 A1 | 6/1996 |
| JP | A-2002-075407 | 3/2002 |
| JP | A-2002-298869 | 10/2002 |
| JP | A-2002-298870 | 10/2002 |
| WO | 00/45448 | 8/2000 |
| WO | WO-01/65623 | 9/2001 |

* cited by examiner

*Primary Examiner*—Patrick Ryan
*Assistant Examiner*—Ben Lewis
(74) *Attorney, Agent, or Firm*—Arent Fox LLP

(57) ABSTRACT

The invention provides a manufacturing process for MEA that enables sufficient bond strength among an electrolyte membrane and electrode substrates even when the electrolyte membrane comprises a heat-resistant material such as an aromatic polymer.

The process comprises pressure bonding an electrolyte membrane with catalyzed electrode substrates to form a membrane-electrode assembly, wherein a good solvent for the electrolyte membrane is applied to at least one of facing surfaces of the opposed electrode substrate and the electrolyte membrane prior to the pressure bonding. The electrolyte membrane may comprise a sulfonated aromatic polymer. The good solvent for the electrolyte membrane may be an aprotic dipolar solvent.

13 Claims, No Drawings

MANUFACTURING PROCESS FOR MEMBRANE-ELECTRODE ASSEMBLIES

FIELD OF THE INVENTION

The present invention relates to a manufacturing process for membrane-electrode assemblies (MEA), and more particularly to an MEA manufacturing process that can combine an electrolyte membrane and electrode substrates with good adhesion to provide high joint reliability.

BACKGROUND OF THE INVENTION

MEA is an integral assembly generally consisting of an electrolyte membrane (proton conductive membrane) and electrode substrates. Conventional production of MEA has been carried out by sandwiching an electrolyte membrane between two electrode substrates and hot pressing them to form an anode/electrolyte/cathode assembly.

Proton conductive membranes based on sulfonated perfluorohydrocarbon, typically Nafion® membranes, are thermoplastic and can be thermocompression bonded with electrodes. On the other hand, electrolyte membranes of aromatic polymers such as sulfonated polyarylenes have heat resistance so that the thermocompression bonding often fails to achieve sufficient bond strength unless carried out at high temperatures that will cause deterioration of metallic catalysts.

Film casting is a method to make electrolyte membranes by flow casting a solution of a polymer in an organic solvent on a substrate, followed by drying the formed coating. In the film casting method, highly dipolar and aprotic organic solvents are generally used to dissolve highly polar polymers with ion-exchange groups, such as proton conductive polymers. These dipolar solvents, due to their high boiling points, are not completely removed upon drying and as a result remain in the final electrolyte membranes. The electrolyte membranes that contain such polar solvents in high concentrations cannot be adequately thermocompression bonded with electrode substrates, causing poor interlaminar bond strength of MEA.

OBJECT OF THE INVENTION

In consideration of these prior art problems, the invention has an object of providing a manufacturing process for MEA that enables sufficient bond strength among an electrolyte membrane and electrode substrates even when the electrolyte membrane comprises a heat-resistant material such as an aromatic polymer.

SUMMARY OF THE INVENTION

The invention achieves the above object by providing the following:

(1) A process of manufacturing membrane-electrode assemblies, said process comprising pressure bonding an electrolyte membrane with electrode substrates to form a membrane-electrode assembly, wherein a good solvent for the electrolyte membrane is applied to at least one of facing surfaces of the opposed electrode substrate and the electrolyte membrane prior to the pressure bonding.

(2) The process as described in (1), wherein a good solvent for the electrolyte membrane is applied to both of the facing surfaces of the opposed electrolyte membrane and the electrode substrate.

(3) The process as described in (1) or (2), wherein the electrolyte membrane is a film produced by a film casting method in which a solution of a proton conductive polymer in an organic solvent is flow cast on a substrate and wherein the electrolyte membrane contains the residual solvent in an amount of 5 parts by weight or less based on 100 parts by weight of the proton conductive polymer.

(4) The process as described in any one of (1) to (3), wherein the electrolyte membrane comprises a sulfonated aromatic polymer.

(5) The process as described in (4), wherein the good solvent for the electrolyte membrane is an aprotic dipolar solvent.

(6) The process as described in (4), wherein the sulfonated aromatic polymer is a sulfonated polyarylene.

DETAILED DESCRIPTION OF THE INVENTION

Hereinbelow, the process for the production of MEA according to the invention will be described in detail.

The process comprises pressure bonding an electrolyte membrane with electrode substrates to form a membrane-electrode assembly. In the pressure bonding, a good solvent for the electrolyte membrane is applied to at least one of facing surfaces of the opposed electrolyte membrane and electrode substrate and thereafter the electrolyte membrane and the electrode substrates are pressure bonded.

Electrode Substrates

The electrode substrates for use in the invention each may be obtained by coating a gas diffusion electrode base with a paste that contains fine particles of hydrogen reduction catalyst supported on conductive porous particles, and a proton conductive polymeric electrolyte component.

The conductive porous particles include those having bulky structures and large specific surface areas, such as Ketjen black and acetylene black. Exemplary hydrogen reduction catalysts include noble metals such as platinum, palladium, ruthenium and rhodium; and alloys of these noble metals with other metals such as chromium, molybdenum, tungsten, titanium, zirconium and cobalt. The metallic catalyst will be supported on the conductive porous particles in amounts of 10 to 60 wt %.

A doctor blade or spraying may be employed for applying the paste containing those fine catalyst particles and polymeric electrolyte component on the porous gas diffusion electrode base such as carbon paper or carbon cloth.

The electrode substrate will range in thickness from 5 to 100 μm, and preferably from 5 to 50 μm.

Electrolyte Membrane

The electrolyte membrane for use in the invention comprises a proton conductive polymer. Exemplary proton conductive polymers include sulfonated polyarylenes, sulfonated polyarylene ethers, sulfonated polyarylene ketones, sulfonated polyether ether ketones, sulfonated polyimides, sulfonated polybenzimidazoles and sulfonated tetrafluoroethylene copolymers. In order to obtain MAE with good electrical properties, the sulfonated aromatic polymers, particularly the sulfonated polyarylenes, are preferable.

The sulfonated polyarylene may be prepared by sulfonating a polymer that results from the reaction of a monomer (A) of the following formula (A) with at least one monomer (B) having any of the following formulae (B-1) to (B-4).

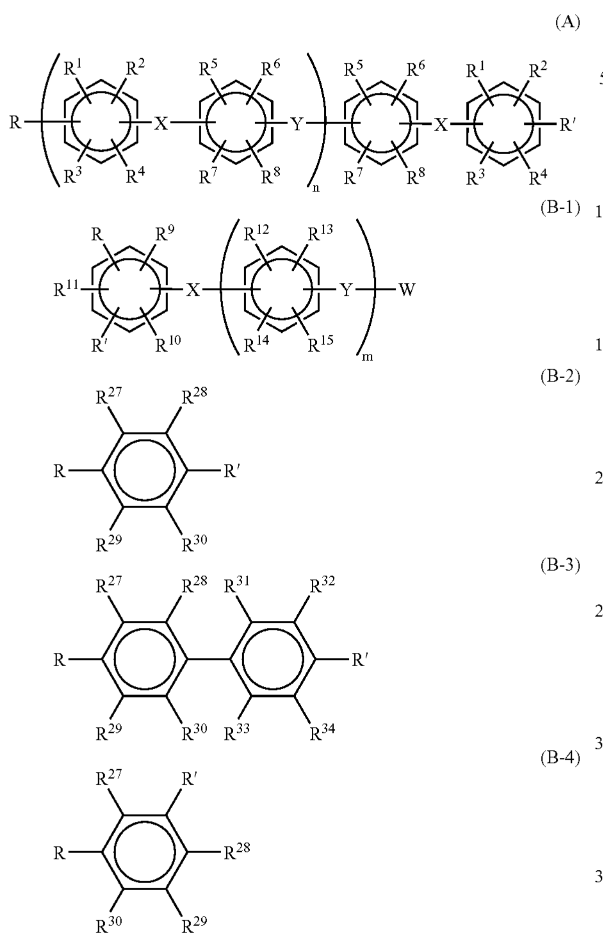

In the formula (A), R and R', which may be the same or different, are each a halogen atom other than a fluorine atom or an —$OSO_2Z$ group (where Z is an alkyl group, a fluorine-substituted alkyl group or an aryl group).

Exemplary groups indicated by Z include:

alkyl groups such as methyl and ethyl groups;

fluorine-substituted alkyl groups such as a trifluoromethyl group; and aryl groups such as phenyl and p-tolyl groups.

$R^1$ to $R^8$, which may be the same or different, are each at least one atom or group selected from the group consisting of a hydrogen atom, a fluorine atom, and alkyl, fluorine-substituted alkyl, allyl and aryl groups.

Examples of the alkyl groups include methyl, ethyl, propyl, butyl, amyl and hexyl groups. Of these, methyl and ethyl groups are preferred.

Examples of the fluorine-substituted alkyl groups include trifluoromethyl, perfluoroethyl, perfluoropropyl, perfluorobutyl, perfluoropentyl and perfluorohexyl groups. Of these, trifluoromethyl and pentafluoroethyl groups are preferred.

Examples of the allyl groups include a propenyl group.

Examples of the aryl groups include phenyl and pentafluorophenyl groups.

X is a divalent electron-withdrawing group. Examples thereof include —CO—, —CONH—, —$(CF_2)_p$— (wherein p is an integer of 1 to 10), —$C(CF_3)_2$—, —COO—, —SO— and —$SO_2$—.

The electron-withdrawing group is defined as a group with a Hammett substituent constant of not less than 0.06 at the m-position of a phenyl group and not less than 0.01 at the p-position.

Y is a divalent electron-donating group. Examples thereof include —O—, —S—, —CH═CH—, —C≡C— and groups represented by the following formulae:

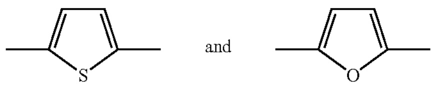

wherein n is 0 or a positive integer of up to 100, and preferably up to 80.

Exemplary monomers of the formula (A) in which n is 0 include 4,4'-dichlorobenzophenone, 4,4'-dichlorobenzanilide, bis(chlorophenyl)difluoromethane, 2,2-bis(4-chlorophenyl)hexafluoropropane, 4-chlorobenzoic acid-4-chlorophenyl, bis(4-chlorophenyl)sulfoxide, bis (4-chlorophenyl) sulfone, corresponding compounds to these compounds except that the chlorine atom is replaced with a bromine or an iodine atom, and corresponding compounds to the above compounds except that at least one of the halogen atoms substituted at the 4-position is altered to a substituent at the 3-position.

Exemplary monomers of the formula (A) in which n is 1 include 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis((4-chlorophenyl.)-1,1,1,3,3,3-hexafluoropropyl) diphenyl ether, 4,4'-bis((4-chlorophenyl)tetrafluoroethyl)diphenyl ether, corresponding compounds to these compounds except that the chlorine atom is replaced with a bromine or an iodine atom, corresponding compounds to the above compounds except that the halogen substitution occurs at the 3-position in place of the 4-position, and corresponding compounds to the above compounds except that at least one of the substituent groups at the 4-position in the diphenyl ether is altered to a substituent at the 3-position.

Also available as the monomer (A) are 2,2-bis(4-(4-(4-chlorobenzoyl)phenoxy)phenyl)-1,1,1,3,3,3-hexafluoropropane, bis(4-(4-(4-chlorobenzoyl) phenoxy)phenyl)sulfone, and compounds represented by the following formulae:

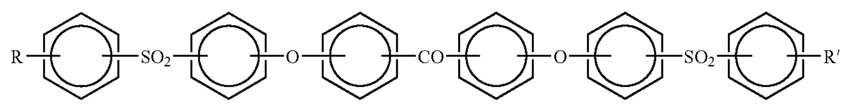

-continued

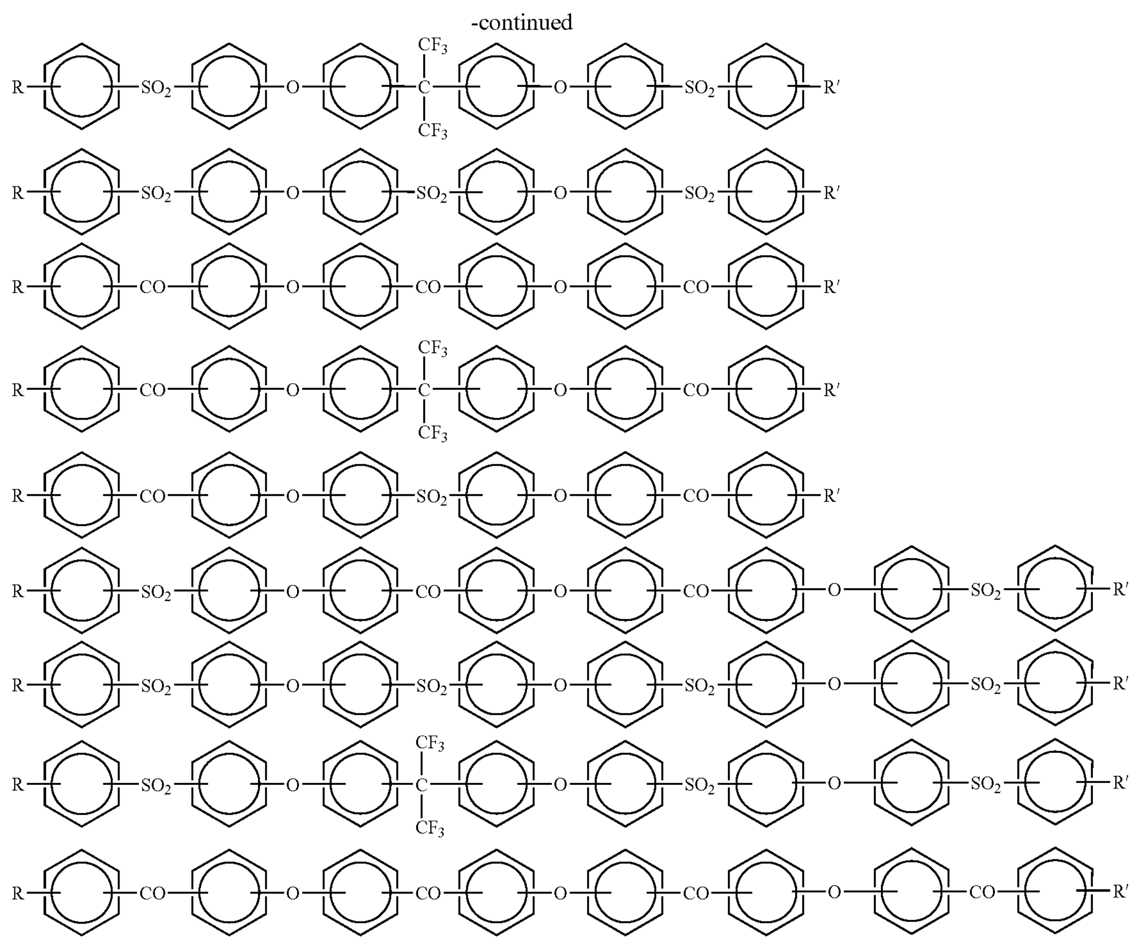

For example, the monomer (A) may be synthesized by the process given below.

First, an alkali metal such as lithium, sodium or potassium, or an alkali metal compound such as alkali metal hydride, alkali metal hydroxide or alkali metal carbonate, is added to bisphenols combined together by the electron-withdrawing group for the purpose of converting them into a corresponding alkali metal salt of bisphenol. This addition is made in a polar solvent of high dielectric constant, such as N-methyl-2-pyrrolidone, N,N-dimethylacetamide, sulfolane, diphenyl sulfone or dimethyl sulfoxide.

The alkali metal or alkali metal compound will be generally used in slight excess relative to the hydroxyl groups of the bisphenol, for example in an equivalent amount 1.1 to 2 times, and preferably 1.2 to 1.5 times with respect to the amount of hydroxyl groups.

Thereafter, the alkali metal salt of bisphenol is reacted with a halogen-substituted, e.g. fluorine- or chlorine-substituted, aromatic dihalide compound which has been activated by the electron-withdrawing groups, in the presence of a solvent that can form an azeotropic mixture with water, such as benzene, toluene, xylene, hexane, cyclohexane, octane, chlorobenzene, dioxane, tetrahydrofuran, anisole or phenetole. Examples of the above aromatic dihalide compound include 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone and 1,3-bis(4-chlorobenzoyl)benzene.

From the viewpoint of reactivity, the aromatic dihalide compound is desirably a fluorine compound. But taking the subsequent aromatic coupling reaction into account, the aromatic nucleophilic substitution reaction should be designed to take place so as to yield a molecule having a chlorine atom at its end(s). The active aromatic dihalide compound may be used in an amount 2 to 4 molar times, and preferably 2.2 to 2.8 molar times the amount of the bisphenol. The reaction temperature is in the range of 60 to 300° C., and preferably 80 to 250° C. The reaction time ranges from 15 minutes to 100 hours, and preferably from 1 to 24 hours.

Optimally, the active aromatic dihalide compound is a chlorofluoro compound as shown in the formula hereinbelow that has two halogen atoms different in reactivity from each other. The use of this compound is advantageous in that the fluorine atom will preferentially undergo the nucleophilic substitution reaction with phenoxide so that the objective chlorine-terminated active compound may be obtained.

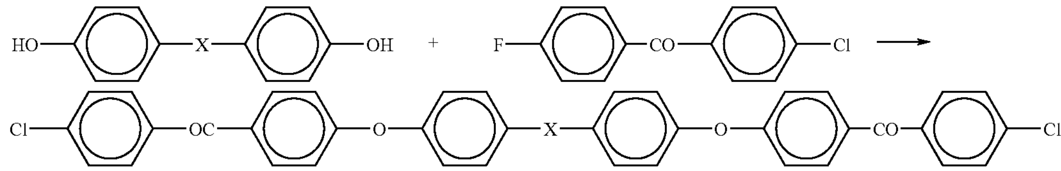

wherein X is as defined in the formula (A).

Other exemplary methods for the synthesis of the monomer (A) include JP-A-2(1990)-159, in which the nucleophilic substitution reaction is carried out combined with an electrophilic substitution reaction to synthesize an objective flexible compound comprising the electron-withdrawing and electron-donating groups.

Specifically, the aromatic dihalide compound activated by the electron-withdrawing group, such as bis(4-chlorophenyl) sulfone, is subjected to the nucleophilic substitution reaction with a phenol compound; thereafter the resultant bis-phenoxy compound is subjected to Friedel-Crafts reaction with, for example, 4-chlorobenzoyl chloride to obtain an objective compound.

In the synthesis, any of the above-exemplified aromatic dihalide compounds can be used as the aromatic dihalide compound activated by the electron-withdrawing group. The phenol compound may be substituted, but is preferably unsubstituted from the viewpoints of heat resistance and flexibility. When substituted, the substituted phenol compound is preferably an alkali metal salt. Any of the alkali metal compounds listed above can be used in the substitution reaction for the phenol compound. The alkali metal compound is used in an amount 1.2 to 2 molar times the amount of the phenol. In the reaction, the aforesaid polar solvent or the azeotropic solvent with water may be employed.

To obtain the objective compound, the bis-phenoxy compound is reacted with chlorobenzoyl chloride as an acylating agent, in the presence of an activator for the Friedel-Crafts reaction, e.g., Lewis acid such as aluminum chloride, boron trifluoride or zinc chloride. The chlorobenzoyl chloride is used in an amount 2 to 4 molar times, and preferably 2.2 to 3 molar times the amount of the bis-phenoxy compound. The Friedel-Crafts reaction activator is used in an equivalent amount 1.1 to 2 times relative to 1 mole of the active halide compound such as an acylating agent chlorobenzoic acid. The reaction time is in the range of 15 minutes to 10 hours, and the reaction temperature is in the range of −20 to 80° C. As a solvent, chlorobenzene, nitrobenzene or the like that is inactive in the Friedel-crafts reaction may be used.

The monomer (A) in which n is 2 or more may be synthesized through polymerization in accordance with the above-mentioned procedure. In this case, a bisphenol, which can supply ether oxygen as the electron donating group Y in the monomer (A), is combined with the electron-withdrawing group X of >C═O, —$SO_2$— and/or >$C(CF_3)_2$ (i.e., 2,2-bis(4-hydroxyphenyl)-1,1,1,3,3,3-hexafluoropropane, 2,2-bis(4-hydroxyphenyl)ketone or 2,2-bis(4-hydroxyphenyl) sulfone) and is reacted with an alkali metal compound; the resultant alkali metal salt of bisphenol is then subjected to a substitution reaction with an excess of the activated aromatic halogen compound such as 4,4-dichlorobenzophenone or bis(4-chlorophenyl) sulfone, in the presence of a polar solvent such as N-methyl-2-pyrrolidone, N,N-dimethylacetamide or sulfolane.

Examples of such monomers (A) include compounds represented by the following formulae:

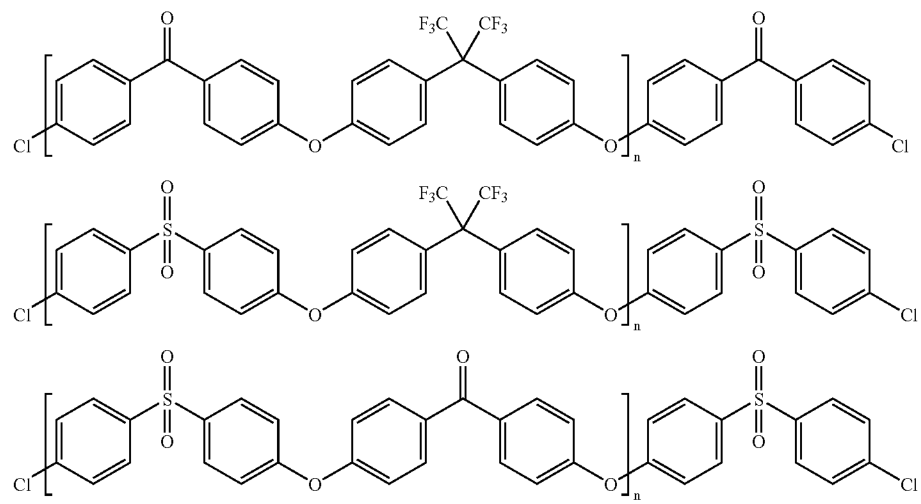

-continued

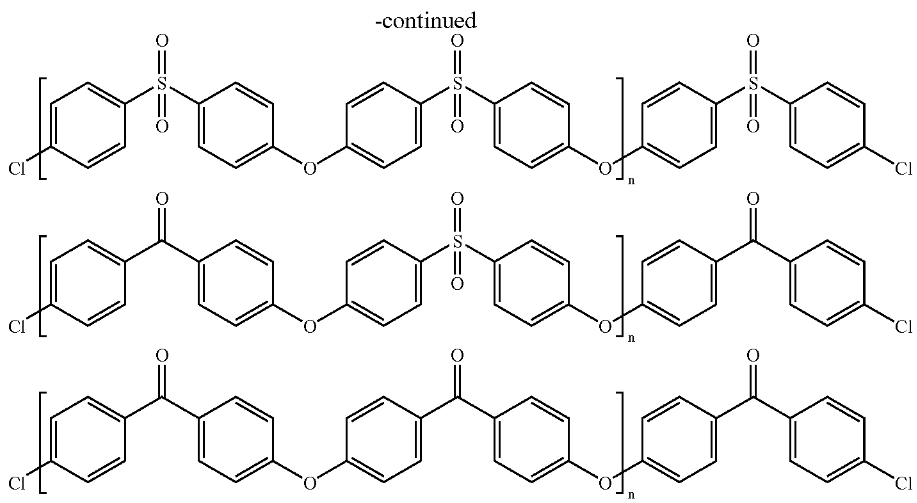

In the above formulae, n is 2 or greater, and preferably from 2 to 100.

Next, the monomers represented by the formulae (B-1) to (B-4) will be described.

(B-1)

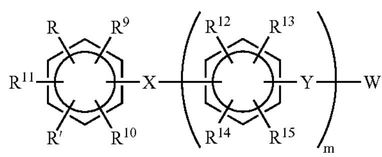

In the above formula, Rand R' maybe the same or different and denote the same groups as defined in the formula (A).

$R^9$ to $R^{15}$, which may be the same or different, are each at least one atom or group selected from a hydrogen atom, a fluorine atom and an alkyl group.

The alkyl groups indicated by $R^9$ to $R^{15}$ include the same alkyl groups as indicated by $R^1$ to $R^8$ in the formula (A).

m is 0, 1 or 2.

X is a divalent electron-withdrawing group selected from the same groups as defined with respect to X in the formula (A).

Y is a divalent electron-donating group selected from the same groups as defined with respect to Y in the formula (A).

W denotes at least one group selected from the group consisting of a phenyl group, a naphthyl group and groups represented by the following formulae (C-1) to (C-3):

(C-1)

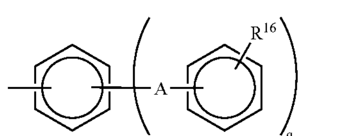

(C-2)

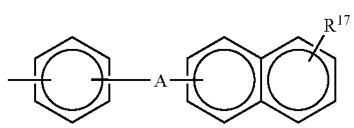

-continued (C-3)

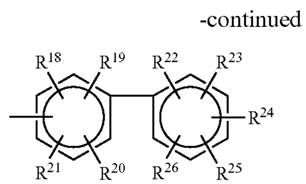

In the above formulae, A denotes an electron-donating group or a single bond. The electron-donating group may be a divalent electron-donating group selected from the same groups as defined with respect to Y in the formula (A).

$R^{16}$ and $R^{17}$ are each a hydrogen atom, an alkyl group or an aryl group. Examples of the alkyl and aryl groups designated by $R^{16}$ and $R^{17}$ include the same alkyl and aryl groups as indicated by $R^1$to $R^8$ in the formula (A).

$R^{18}$ to $R^{26}$, which may be the same or different, are each at least one atom or group selected from a hydrogen atom, a fluorine atom and an alkyl group. Examples of the alkyl groups designated by $R^{18}$ to $R^{26}$ include the same alkyl groups as indicated by $R^1$ to $R^8$ in the formula (A).

q is 0 or 1.

Exemplary monomers represented by the formula (B-1) include compounds with the following formulae:

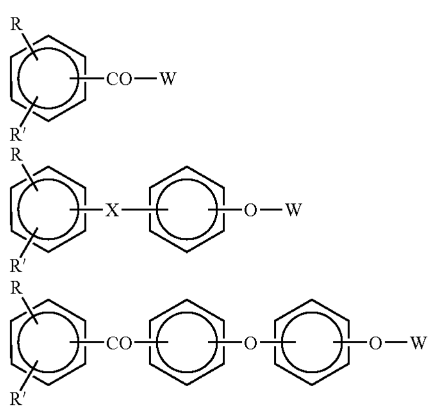

More specifically, the monomers of the formula (B-1) may be represented as follows:

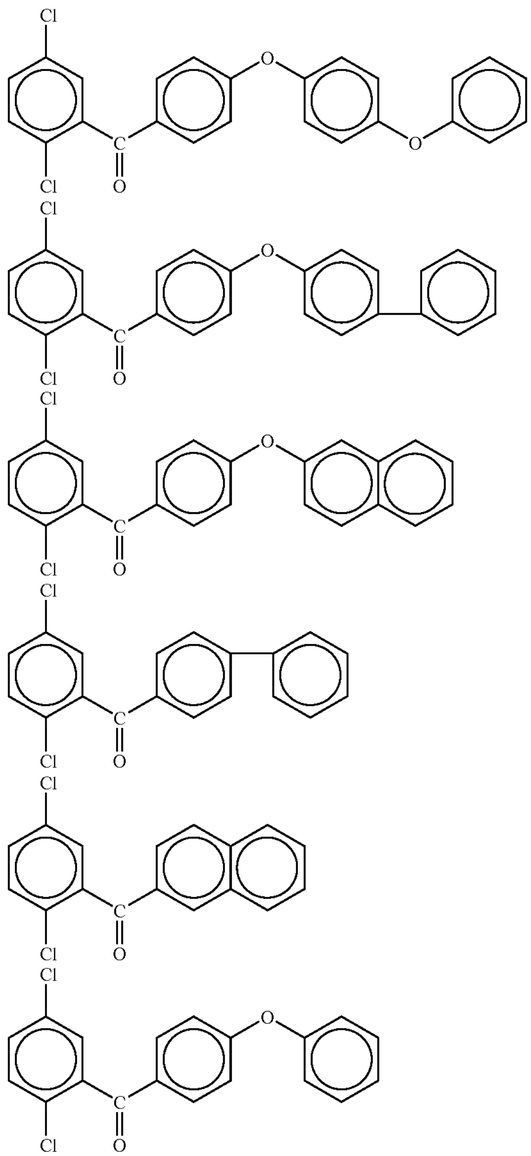

Further, corresponding compounds to the above compounds except that the chlorine atom is replaced with a bromine or an iodine atom are also available.

(B-2)

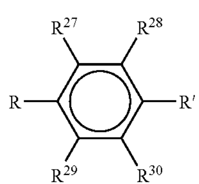

-continued (B-3)

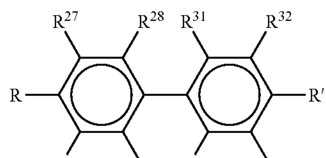

(B-4)

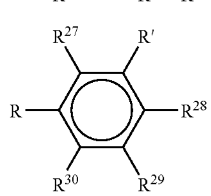

In the formulae (B-2) to (B-4), R and R' may be the same or different and denote the same groups as defined in the formula (A).

$R^{27}$ to $R^{34}$, which may be the same or different, are each a hydrogen atom, a fluorine atom, an alkyl group, a fluorine-substituted alkyl group, an aryl group or a group represented by the following formula (D):

(D)

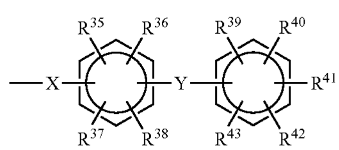

wherein $R^{35}$ to $R^{43}$, which may be the same or different, are each a hydrogen atom, a halogen atom, an alkyl group or a fluorine-substituted alkyl group.

$R^{27}$ to $R^{34}$ and $R^{35}$ to $R^{43}$ may represent the same alkyl and fluorine-substituted alkyl groups as indicated by $R^1$ to $R^8$. $R^{27}$ to $R^{34}$ may represent the same aryl groups as indicated by $R^1$ to $R^8$.

X denotes a divalent electron-withdrawing group selected from the same groups as defined with respect to X in the formula (A).

Y denotes a divalent electron-donating group selected from the same groups as defined with respect to Y in the formula (A).

Examples of the monomers having the formula (B-2) include p-dichlorobenzene, p-dimethylsulfonyloxybenzene, 2,5-dichlorotoluene, 2,5-dimethylsulfonyloxybenzene, 2,5-dichloro-p-xylene, 2,5-dichlorobenzotrifluoride, 1,4-dichloro-2,3,5,6-tetrafluorobenzene, and corresponding compounds to these compounds except that the chlorine atom is replaced with a bromine or an iodine atom.

Examples of the monomers having the formula (B-3) include 4,4'-dimethylsulfonyloxybiphenyl, 4,4'-dimethylsulfonyloxy-3,3'-dipropenylbiphenyl, 4,4'-dibromobiphenyl, 4,4'-diiodobiphenyl, 4,4'-dimethylsulfonyloxy-3,3'-dimethylbiphenyl, 4,4'-dimethylsulfonyloxy-3,3'-difluorobiphenyl, 4,4'-dimethylsulfonyloxy-3,3',5,5'-tetrafluorobiphenyl, 4,4'-dibromooctafluorobiphenyl and 4,4'-dimethylsulfonyloxy-octafluorobiphenyl.

Examples of the monomers having the formula (B-4) include m-dichlorobenzene, m-dimethylsulfonyloxybenzene, 2,4-dichlorotoluene, 3,5-dichlorotoluene, 2,6-dichlorotoluene, 3,5-dimethylsulfonyloxytoluene, 2,6-dimethylsulfonyloxytoluene, 2,4-dichlorobenzotrifluoride, 3,5-dichlorobenzotrifluoride, 1,3-dibromo-2,4,5,6-tetrafluorobenzene, and corresponding compounds to these compounds except that the chlorine atom is replaced with a bromine or an iodine atom.

To synthesize the polyarylene, the monomers mentioned above are reacted in the presence of a catalyst. The catalyst used herein is a catalyst system containing a transition metal compound. This catalyst system essentially contains (1) a transition metal salt and a compound which functions as a ligand (referred to as the "ligand component" hereinafter), or a transition metal complex (including a copper salt) to which a ligand(s) has been coordinated, and (2) a reducing agent. A "salt" may be added to increase the polymerization rate.

Examples of the transition metal salt include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride and nickel bromide are particularly preferred.

Examples of the ligand component include triphenylphosphine, 2,2'-bipyridine, 1,75215-cyclooctadiene and 1,3-bis(diphenylphosphino)propane. Of these, triphenylphosphine and 2,2'-bipyridine are preferred. The ligand components may be used singly or in combination of two or more kinds.

Examples of the transition metal complex with coordinated ligands include nickel chloride-bis(triphenylphosphine), nickel bromide-bis(triphenylphosphine), nickel iodide-bis(triphenylphosphine), nickel nitrate-bis(triphenylphosphine), nickel chloride(2,2'-bipyridine), nickel bromide(2,2'-bipyridine), nickel iodide(2,2'-bipyridine), nickel nitrate(2,2'-bipyridine), bis(1,5-cyclooctadiene)nickel, tetrakis(triphenylphosphine)nickel, tetrakis(triphenylphosphite)nickel and tetrakis(triphenylphosphine)palladium. Of these, nickel chloride-bis(triphenylphosphine) and nickel chloride(2,2'-bipyridine) are preferred.

Examples of the reducing agent employable in the aforesaid catalyst system include iron, zinc, manganese, aluminum, magnesium, sodium and calcium. Of these, zinc, magnesium and manganese are preferable. These reducing agents may be used in a more activated form brought about by contact with an acid such as an organic acid.

Examples of the "salt" employable in the catalyst system include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

In respect of the proportion of the above components, the transition metal salt or the transition metal complex is usually used in an amount of 0.0001 to 10 mol, and preferably 0.01 to 0.5 mol based on 1 mol of the total monomers. If the amount is less than 0.0001 mol, the polymerization may not proceed sufficiently. Contrary, the amount exceeding 10 mol may result in a lowered molecular weight of the polyarylene.

When the catalyst system contains the transition metal salt and the ligand component, the ligand component usually has an amount of 0.1 to 100 mol, and preferably 1 to 10 mol based on 1 mol of the transition metal salt. If the amount is less than 0.1 mol, the catalytic activity may become insufficient. Contrary, the amount exceeding 100 mol may result in a lowered molecular weight of the polyarylene.

The amount of the reducing agent is usually in the range of 0.1 to 100 mol, and preferably 1 to 10 mol based on 1 mol of the total monomers. If the reducing agent is used in an amount of less than 0.1 mol, the polymerization may not proceed sufficiently. Contrary, the amount thereof exceeding 100 mol may make the purification of the resulting polymer more difficult.

When the "salt" is used, the amount thereof is usually 0.001 to 100 mol, and preferably 0.01 to 1 mol based on 1 mol of the total monomers. If the salt is used in an amount of less than 0.001 mol, sufficient effect of increasing the polymerization rate often cannot be obtained. Contrary, the amount thereof exceeding 100 mol may result in difficult purification of the resulting polymer.

Suitable solvents for the above polymerization include tetrahydrofuran, cyclohexanone, dimethyl sulfoxide, N,N-dimethylformamide, N,N-dimethylacetamide, N-methyl-2-pyrrolidone, γ-butyrolactone and γ-butyrolactam. Of these, tetrahydrofuran, N,N-dimethylformamide, N,N-dimethylacetamide and N-methyl-2-pyrrolidone are preferred. These polymerization solvents are desirably used after dried sufficiently.

The concentration of the total monomers in the polymerization solvent is usually in the range of 1 to 90 wt %, and preferably 5 to 40 wt %.

The polymerization will be usually carried out at 0 to 200° C., and preferably 50 to 120° C., and over a period of 0.5 to 100 hours, and preferably 1 to 40 hours.

The polymerization of the monomer (A) having the formula (A) with at least one monomer (B) represented by any of the formulae (B-1) to (B-4) as described above yields a polymerization solution containing the polyarylene.

The thus-obtained polyarylene, which has no sulfonic acid groups, is then treated with a sulfonating agent by the conventional technique, introducing thereinto sulfonic acid groups. The polyarylene having sulfonic acid groups may be thus obtained.

For introduction of sulfonic acid groups, the polyarylene having no sulfonic acid groups may be treated with a conventional sulfonating agent, such as sulfuric anhydride, fuming sulfuric acid, chlorosulfonic acid, sulfuric acid or sodium bisulfite, under known conditions (see Polymer Preprints, Japan, vol. 42, No. 3, p. 730 (1993), Polymer Preprints, Japan, vol. 42, No. 3, p. 736 (1994), Polymer Preprints, Japan, vol. 42, No. 7, pp. 2490-2492 (1993)).

Specifically, the polyarylene having no sulfonic acid groups is reacted with the sulfonating agent in the presence or absence of a solvent. Examples of the solvent include hydrocarbon solvents such as n-hexane; ether-based solvents such as tetrahydrofuran and dioxane; aprotic polar solvents such as dimethylacetamide, dimethylformamide and dimethyl sulfoxide; and halogenated hydrocarbons such as tetrachloroethane, dichloroethane, chloroform and methylene chloride. Although the temperature in the sulfonation is not specifically limited, it is usually in the range of −50 to 200° C., and preferably −10 to 100° C. The reaction time is usually 0.5 to 1,000 hours, and preferably 1 to 200 hours.

In the invention, the sulfonated polyarylene will contain sulfonic acid groups in an amount of 0.5 to 3 meq/g, and preferably 0.8 to 2.8 meq/g. If the sulfonic acid group content is less than 0.5 meq/g, the proton conductivity may be insufficient. Contrary, when it exceeds 3 meq/g, hydrophilicity is so increased that the resulting polymer becomes water soluble or, if not water soluble, less durable.

The precursor polymer of the sulfonated polyarylene (i.e., polyarylene prior to the sulfonation) has a weight-average molecular weight of 10,000 to 1,000,000, and preferably 20,000 to 800,000, in terms of polystyrene. When the weight-average molecular weight is less than 10,000, coating properties become so poor that cracks may form in the resultant film, and also mechanical strength may be insufficient. On the other hand, the weight-average molecular weight exceeding 1,000,000 leads to bad solubility and high solution viscosity, causing bad processability.

Meanwhile, the sulfonated polyarylene may be also produced by hydrolysis of a polyarylene resulting from homopolymerization of an aromatic sulfonate derivative represented by the formula (E):

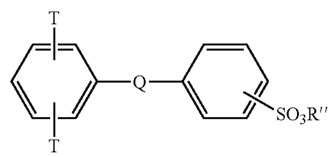

(E)

wherein T is a halogen atom other than a fluorine atom, an $—OSO_3CH_3$ group or an $—OSO_3CF_3$ group; Q is a divalent organic group; and R" is a hydrocarbon group of 4 to 20 carbon atoms.

Alternatively, the sulfonated polyarylene may be produced by hydrolysis of a polyarylene resulting from copolymerization of the aromatic sulfonate derivative of the formula (E) with at least one compound having the aforesaid formula (A).

For example, the electrolyte membrane for use in the invention may be produced by a film casting method in which a proton conductive polymer such as the aforesaid sulfonated polymer is dissolved in an organic solvent and the solution is flow-cast over a substrate to form a film. The substrate used herein is not particularly limited and may be selected from those substrates commonly used in the film casting methods. Examples thereof include plastic substrates and metal substrates. For example, thermoplastic resin substrates such as polyethyleneterephthalate (PET) films are preferable.

The organic solvents to dissolve the proton conductive polymer include aprotic polar solvents such as N-methyl-2-pyrrolidone, N,N-dimethylformamide, y-butyrolactone, N,N-dimethylacetamide, dimethylsulfoxide and dimethylurea. Of these, N-methyl-2-pyrrolidone is preferable in terms of solvent properties and solution viscosity. These aprotic polar solvents may be used singly or in combination of two or more kinds.

The organic solvent for dissolving the proton conductive polymer may be a mixed solvent of the above aprotic polar solvent and an alcohol. Exemplary alcohols include methanol, ethanol, propyl alcohol, isopropyl alcohol, sec-butyl alcohol and tert-butyl alcohol. In particular, methanol is preferable since it ensures an appropriately low solution viscosity over a wide range of proportions of the proton conductive polymer. These alcohols may be used singly or in combination of two or more kinds.

The above mixed solvent will contain the aprotic polar solvent in an amount of 95 to 25 wt %, and preferably 75 to 25 wt %, and the alcohol in an amount of 5 to 75 wt %, and preferably 25 to 75 wt % (the total of these two is 100 wt %). This proportion of the alcohol leads to an appropriately low solution viscosity.

Although the concentration of the proton conductive polymer in the solution (i.e. the polymer concentration) depends on the molecular weight of the polymer, it is generally between 5 and 40 wt %, and preferably between 7 and 25 wt %. The polymer concentration less than 5 wt % causes difficulties in producing the membrane in large thickness and results in easy occurrence of pinholes. On the other hand, when the polymer concentration exceeds 40 wt %, the solution viscosity becomes so high that the production of membrane from the solution will be difficult and further that the obtained film may have low surface smoothness.

The solution viscosity may vary depending on the molecular weight of the proton conductive polymer or the polymer concentration. Generally, it is between 2,000 and 100,000 mPa·s, and preferably between 3,000 and 50,000 mPa·s. When the viscosity is less than 2,000 mPa·s, the solution will have too high a fluidity and may spill out of the substrate during the membrane production. On the contrary, the viscosity over 100,000 mPa·s is so high that the solution cannot be extruded through a die and the flow-casting for the film production may be difficult.

Preferably, the wet film obtained as above will be soaked in water to substitute the remaining organic solvent in the film with water. The amount of the residual solvent in the proton conductive membrane can be reduced by this treatment.

Prior to the soak in water, the wet film may be predried. The predrying may be carried out by leaving the wet film at 50 to 150° C. for 0.1 to 10 hours.

Soaking the wet films in water may be carried out batchwise with respect to each sheet, or may be a continuous process where the films in the original form of laminate with a substrate film (e.g. PET film) as produced are soaked in water and wound sequentially.

In the batchwise soaking, the films are suitably framed or fixed by similar means to prevent wrinkles from forming on the surface of treated films.

The soaking should be suitably made so that the wet films would contact with water that is at least 10 parts by weight, and preferably at least 30 parts by weight based on 1 part by weight of the wet films. This contact ratio is suitably set as large as possible to minimize the amount of solvent remaining in the electrolyte membrane. For the purpose of reducing the residual solvent amount, it is also effective to keep the concentration of the organic solvent in water at or below a certain level by renewing the water used in the soaking or by letting the water overflow. The in-plane distribution of the organic solvent within the electrolyte membrane may be effectively uniformed by homogenizing the organic solvent concentration in the water by stirring or the like.

When the wet film is soaked in water, the water preferably has a temperature of 5 to 80° C. Although the substitution between the organic solvent and water can take place at a higher rate as the water temperature rises, the water absorption in the film will also increase at higher temperatures. Accordingly, there is a concern that the electrolyte membrane has a rough surface after dried. In general, the water temperature is suitably between 10 and 60° C. from the viewpoints of the substitution rate and handling properties.

The soaking time varies depending on the initial amount of residual solvent, the water-solvent contact ratio and the water temperature. Generally, the soaking time ranges from 10 minutes to 240 hours, and preferably from 30 minutes to 100 hours.

Drying the water-soaked wet film gives an electrolyte membrane having a reduced amount of residual organic solvent, which is generally 5 parts by weight or less based on 100 parts by weight of the proton conductive polymer.

Controlling the soaking conditions enables reduction of the residual solvent to 1 part by weight or less based on 100 parts by weight of the proton conductive membrane. For example, this is possible when the wet film is soaked in water that is at least 50 parts by weight based on 1 part by weight of the wet film, at a water temperature of 10 to 60° C. over a period of 10 minutes to 10 hours.

When the electrolyte membrane contains a large amount of the residual organic solvent such as the polar solvent, it will have poorer heat resistance due to the function of the polar solvent as plasticizer, and will also cause cells to take a very long time until stable electricity generation. Furthermore, the solvent can be removed by thermal changes during electricity generation to produce contraction stress, which causes a permanent set in the film. Such strained films can be cracked by some shocks and the cell may be deformed. With these expected problems in consideration, the residual organic solvent is preferably reduced to 5 parts by weight or less.

After the wet film has been soaked in water as described above, the film will be dried at 30 to 100° C., preferably 50 to 80° C., for 10 to 180 minutes, preferably 15 to 60 minutes. Subsequently, it will be dried at 50 to 150° C. and under atmospheric pressure or invacuo, preferably at 500 to 0.1 mmHg, for 0.5 to 24 hours. The electrolyte membrane according to the invention may be thus obtained.

The electrolyte membrane obtained as described above will range in dry thickness from 10 to 100 μm, and preferably from 20 to 80 μm.

Good Solvent for Electrolyte Membrane

The good solvent for the electrolyte membrane will be preferably an aprotic dipolar solvent having a dielectric constant of 20 or more, and preferably 30 or more.

When the aprotic dipolar solvent has a dielectric constant of 20 or more, the electrolyte membrane and the electrode substrates may be combined with sufficient adhesion to form a satisfactory membrane-electrode assembly.

On the other hand, when the dielectric constant is below 20, the adhesion among the electrolyte membrane and the electrode substrates becomes insufficient to cause problems such as lower generating performance.

The suitable aprotic dipolar solvents include N,N-dimethylformamide (boiling point: 153° C., dielectric constant: 36.71), N,N-dimethylacetamide (166° C., 37.78), N-methyl-2-pyrrolidone (202° C., 32), γ-butyrolactone (204° C., 39), tetramethylurea (177° C., 30 or more), dimethylsulfoxide (189° C., 46.68), hexamethylphosphoric triamide (233° C., 30) and sulfolane (287° C., 43.3).

These dielectric constants are based on the data described in Organic Solvents (written by Riddick and Bunger, published from Wiley-Interscience, 1970).

Manufacturing Process

In the invention, the good solvent for the electrolyte membrane is applied to at least one, and preferably both of the facing surfaces of the opposed electrolyte membrane and the electrode substrate. The application method is not particularly limited if it can spread the solvent uniformly over the facing surface(s) of the opposed electrode substrate and the electrolyte membrane. Exemplary methods include spray coating with air guns, airless guns and aerosol sprays, dip coating, flow coating, brush coating and sponge coating.

The good solvent will be usually applied in an amount of 0.001 to 10 mg/cm$^2$, and preferably 0.01 to 1 mg/cm$^2$. When this amount is too small, the adhesion between the electrolyte membrane and the electrode substrate may be unfavorably bad. On the other hand, too high an amount leads to swelling and dissolution of the electrolyte membrane, resulting in deformation.

Subsequently, the electrode substrates and the electrolyte membrane are pressure bonded. The pressure bonding for the electrode substrates and the electrolyte membrane may be performed using an apparatus capable of pressing and heating. For example, a hot press or a roller press may be suitably employed. The pressure bonding should be carried out at temperatures higher than the glass transition temperature of the electrolyte membrane, and is generally between 80 and 200° C. The pressure in the pressure bonding depends on the thickness of the electrode membranes and the like, but is generally in the range of 0.5 to 20 MPa.

EXAMPLES

The present invention will be hereinafter described in more detail by the following Examples, but it should be construed that the invention is in no way limited to those Examples.

The residual amount of N-methyl-2-pyrrolidone (NMP) was determined as described below.

Residual NMP Amount

The proton conductive membrane was dissolved in DMSO-d6, and the solution was subjected 128 times to integrating measurement of $^1$H-NMR. The amount (parts by weight) of NMP per 100 parts by weight of the polymer was determined from a ratio of the peak intensity of NMP to that of the polymer.

Production Example

Synthesis of Sulfonated Polyarylene

Preparation of Oligomer

A 1-liter, three-necked flask equipped with a stirrer, a thermometer, a condenser tube, a Dean-Stark tube and a three-way nitrogen inlet cock was charged with:

67.3 g (0.20 mol) of 2,2-bis(4-hydroxyphenyl)-1,1,1,3,3,3-hexafluoropropane (bisphenol AF), 60.3 g (0.24 mol) of 4,4'-dichlorobenzophenone (4,4'-DCBP), 71.9 g (0.52 mol) of potassium carbonate, 300 ml of N,N-dimethylacetamide (DMAc), and 150 ml of toluene.

The flask was placed in an oil bath, and the contents were heated at 130° C. with stirring in a nitrogen atmosphere. Water yielded during the reaction was allowed to form an azeotropic mixture with toluene and removed outside the system through the Dean-Stark tube. The generation of water almost ceased in about 3 hours. Then the reaction temperature was raised gradually from 130° C. to 150° C., during which most of the toluene was removed. After the reaction was continued at 150° C. for 10 hours, 10.0 g (0.040 mol) of 4,4'-DCBP was added and the reaction was continued for another 5 hours. The reaction solution thus obtained was allowed to cool naturally and filtered to remove the precipitate consisting of by-product inorganic compounds. The filtrate was poured into 4 liters of methanol. The precipitated reaction product was filtered off, dried and dissolved in 300 ml of tetrahydrofuran. The thus-formed solution was poured into 4 liters of methanol to precipitate an objective compound. The compound weighed 95 g (85% yield).

The above-obtained polymer had a number-average molecular weight in terms of polystyrene of 9,900 as measured by GPC (THF solvent) The polymer was found to be soluble in THF, NMP, DMAc, sulfolane and the like. The glass transition temperature (Tg) and heat decomposition temperature thereof were 110° C. and 498° C. respectively.

The polymer obtained above was expected to have a structure represented by the following formula (I):

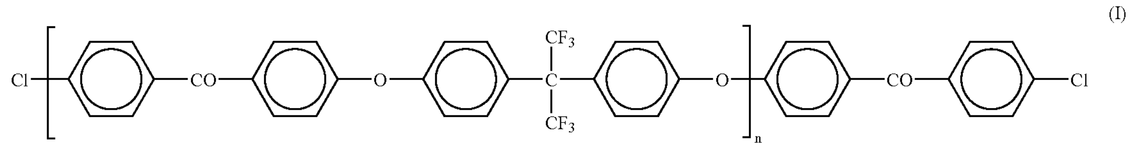

Synthesis of Copolymer Containing Polyarylene

A flask was charged with:

28.4 g (2.87 mmol) of the oligomer having the formula 29.2 g (67.1 mmol) of 2,5-dichloro-4'-(4-phenoxy)phenoxybenzophenone (DCPPB), 1.37 g (2.1 mmol) of bis(triphenylphosphine)nickel dichloride, 1.36 g (9.07 mmol) of sodium iodide, 7.34 g (28.0 mmol) of triphenylphosphine, and 11.0 g (168 mmol) of zinc powder.

Inside the flask had been purged with dried nitrogen, 130 ml of N-methyl-2-pyrrolidone was added and the mixture was heated to 80° C., followed by stirring for 4 hours to carry out polymerization. The resultant polymerization solution was diluted with THF and was poured into hydrochloric acid/methanol to precipitate a copolymer. Subsequently, the copolymer was recovered, repeatedly washed with methanol, dissolved in THF, and reprecipitated in methanol. Thus purified copolymer was filtered off and vacuum dried to give an objective copolymer in an amount of 50.7 g (96% yield). GPC (THF solvent) provided that the copolymer had a number-average molecular weight of 40,000 and a weight-average molecular weight of 145,000, both in terms of polystyrene.

Preparation of Sulfonated Polymer

A 25-g portion of the copolymer obtained above was placed in a 500 ml separable flask and 250 ml of a 96% sulfuric acid solution was added thereto, followed by stirring for 24 hours in a stream of nitrogen. The resultant solution was poured into a large amount of ion-exchange water to precipitate a polymer. The polymer was repeatedly washed with water until the pH in the used water reached 5, and was thereafter dried to give a sulfonated polymer in an amount of 29 g (96%). GPC (NMP solvent) provided that the sulfonated polymer had a number-average molecular weight of 67,000 and a weight-average molecular weight of 277,000, both in terms of polystyrene.

Example 1

The sulfonated polyarylene copolymer was dissolved in a mixed solvent consisting of NMP and methanol (1/1 weight ratio) with 15 wt % copolymer concentration. The solution was flow cast on a PET film and dried for 1 hour in a 120° C. oven with internal air circulation to give a membrane having a thickness of 40 μm. Twenty A4 specimens cut from the membrane were soaked in 100 liters of distilled water over a period of 48 hours, and were dried for 1 hour in a 80° C. oven with internal air circulation. Thus, proton conductive membranes having a residual NMP amount of 0.5 part by weight were obtained.

Each proton conductive membrane was sandwiched between catalyzed electrode substrates, in which NMP had been sprayed on catalyst/carbon surfaces (EC-20-20-10 available from TOYO TECHNICA INC., catalyst amount=1 mg/cm$^2$, 20 wt % platinum supported on Vulcan XC-72), so that both the catalyst/carbon surfaces would contact with the proton conductive membrane. They were hot pressed at 160° C. and 2.45 MPa for 15 minutes to form a membrane-electrode assembly (MEA) consisting of the proton conductive membrane and the catalyzed electrode substrates.

This MEA was placed in a thermo-hygrostat under the conditions of 85° C. and 90% RH similar to those in practical working conditions for fuel cells. No defects were caused in the interfaces between the proton conductive membrane and the catalyzed electrode substrate in the following 5000 hours.

Example 2

MEA was manufactured by the procedure illustrated in Example i except that the catalyst/carbon surfaces were coated with N,N-dimethylacetamide (DMAC) in place of NMP. This MEA was placed in a thermo-hygrostat under the conditions of 85° C. and 90% RH similar to those in practical working conditions for fuel cells. No defects were caused in the interfaces between the proton conductive membrane and the catalyzed electrode substrate in the following 5000 hours.

Example 3

MEA was manufactured by the procedure illustrated in Example 1 except that the catalyst/carbon surfaces were coated with dimethylsulfoxide in place of NMP. This MEA was placed in a thermo-hygrostat under the conditions of 85° C. and 90% RH similar to those in practical working conditions for fuel cells. No defects were caused in the interfaces between the proton conductive membrane and the catalyzed electrode substrate in the following 5000 hours.

Comparative Example 1

MEA was manufactured by the procedure illustrated in Example 1 except that no solvent was applied to the catalyst/carbon surfaces. This MEA was placed in a thermo-hygrostat under the conditions of 85° C. and 90% RH similar to those in practical working conditions for fuel cells. Separation was caused in the interfaces between the proton conductive membrane and the catalyzed electrode substrate in 10 hours.

Comparative Example 2

MEA was manufactured by the procedure illustrated in Example 1 except that tetrahydrofuran (dielectric constant: 7.58) was applied to the catalyst/carbon surfaces. This MEA was placed in a thermo-hygrostat under the conditions of 85°

C. and 90% RH similar to those in practical working conditions for fuel cells. Separation was caused in the interfaces between the proton conductive membrane and the catalyzed electrode substrate in 15 hours.

EFFECT OF THE INVENTION

The invention enables production of membrane-electrode assemblies with sufficient bond strength among an electrolyte membrane and electrode substrates even if the electrolyte membrane is made from a heat resistant material such as an aromatic polymer.

The invention claimed is:

1. A process of manufacturing membrane-electrode assemblies, said process comprising forming an electrolyte membrane by a film casting method in which a solution of a proton conductive polymer in a first organic solvent is flow cast on a film-casting substrate to form a wet film, and the electrolyte membrane is obtained by reducing an amount of residual solvent in the wet film, wherein the electrolyte membrane contains residual solvent in an amount of 1 part by weight or less based on 100 parts by weight of the proton conductive polymer;

applying a second solvent to at least one facing surface of an electrode substrate and the electrolyte membrane; and then pressure bonding said electrolyte membrane with said electrode substrate to form a membrane-electrode assembly, wherein the second solvent is applied in an amount of from 0.001 $mg/cm^2$ to 10 $mg/cm^2$.

2. The process as claimed in claim 1, wherein the second solvent for the electrolyte membrane is applied to both of the facing surfaces of the opposed electrolyte membrane and the electrode substrate.

3. The process as claimed in claim 1, wherein the electrolyte membrane comprises a sulfonated aromatic polymer.

4. The process as claimed in claim 3, wherein the second solvent for the electrolyte membrane is an aprotic dipolar solvent.

5. The process as claimed in claim 3, wherein the sulfonated aromatic polymer is a sulfonated polyarylene.

6. The process as claimed in claim 1, wherein the amount of residual solvent in the wet film is reduced by soaking the wet film in water.

7. The process as claimed in claim 1, wherein the second solvent for the electrolyte membrane is applied to at least the facing surface of the electrode substrate.

8. The process as claimed in claim 1, wherein a pressure in the pressure bonding is in the range of 0.5 to 20 MPa.

9. The process as claimed in claim 1, wherein the second solvent is applied in an amount of from 0.01 $mg/cm^2$ to 1 $mg/cm^2$.

10. The process as claimed in claim 1, wherein the second solvent has a dielectric constant of 20 or more.

11. The process as claimed in claim 1, wherein the second solvent is at least one selected from the group consisting of N,N-dimethylacetamide, N-methyl-2-pyrrolidone, y-butyrolactone, tetramethylurea, dimethylsulfoxide, hexamethylphosphoric triamide and sulfolane.

12. A process of manufacturing membrane-electrode assemblies, said process comprising forming an electrolyte membrane by (a) producing a wet electrolyte membrane film by a film casting method in which a solution of a proton conductive polymer in a first organic solvent is flow cast on a film-casting substrate, and (b) reducing an amount of residual solvent in the wet electrolyte membrane film to form the electrolyte membrane;

applying a second solvent to at least one facing surface of an electrode substrate and the electrolyte membrane; and then pressure bonding said electrolyte membrane with said electrode substrate to form a membrane-electrode assembly.

13. A process of manufacturing membrane-electrode assemblies, said process comprising forming an electrolyte membrane by (a) producing a wet electrolyte membrane film by a film casting method in which a solution of a proton conductive polymer in a first organic solvent is flow cast on a film-casting substrate, (b) reducing an amount of residual solvent in the wet electrolyte membrane film by soaking in water, and (c) drying the soaked, wet electrolyte membrane film to form the electrolyte membrane;

applying a second solvent to at least one facing surface of an electrode substrate and the electrolyte membrane; and then pressure bonding said electrolyte membrane with said electrode substrate to form a membrane-electrode assembly.

* * * * *